United States Patent
Mizutani et al.

(10) Patent No.: US 10,261,508 B2
(45) Date of Patent: Apr. 16, 2019

(54) ROBOT CONTROL SYSTEM AND RECORDING MEDIUM

(71) Applicant: FUJI XEROX CO., LTD., Tokyo (JP)

(72) Inventors: Ryota Mizutani, Yokohama (JP); Roshan Thapliya, Yokohama (JP); Kazunari Komatsuzaki, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 57 days.

(21) Appl. No.: 15/348,073

(22) Filed: Nov. 10, 2016

(65) Prior Publication Data

US 2017/0357256 A1    Dec. 14, 2017

(30) Foreign Application Priority Data

Jun. 14, 2016 (JP) .................................. 2016-117763

(51) Int. Cl.
| | |
|---|---|
| *G05B 19/418* | (2006.01) |
| *G05D 1/00* | (2006.01) |
| *B25J 11/00* | (2006.01) |
| *G05D 1/02* | (2006.01) |
| *G06Q 10/06* | (2012.01) |

(52) U.S. Cl.
CPC ........ *G05D 1/0027* (2013.01); *B25J 11/0005* (2013.01); *G05D 1/0223* (2013.01); *G05D 1/0297* (2013.01); *G06Q 10/06311* (2013.01); *G05D 2201/0211* (2013.01)

(58) Field of Classification Search
CPC . B25J 11/0005; G05D 1/0027; G05D 1/0223; G05D 1/0297; G06Q 10/06311
USPC ........................................................... 700/248
See application file for complete search history.

(56) References Cited

U.S. PATENT DOCUMENTS

| | | | |
|---|---|---|---|
| 5,825,981 A * | 10/1998 | Matsuda ........... | G05B 19/41815 700/248 |
| 6,374,155 B1 | 4/2002 | Wallach et al. | |
| 6,496,755 B2 | 12/2002 | Wallach et al. | |
| 2002/0095239 A1 | 7/2002 | Wallach et al. | |
| 2004/0162637 A1 | 8/2004 | Wang et al. | |
| 2005/0256610 A1* | 11/2005 | Orita ................ | G05D 1/0088 700/248 |
| 2008/0009970 A1* | 1/2008 | Bruemmer ........ | G05D 1/0088 700/245 |

(Continued)

FOREIGN PATENT DOCUMENTS

| | | |
|---|---|---|
| JP | 2007-287071 A | 11/2007 |
| JP | 4951180 B2 | 6/2012 |

OTHER PUBLICATIONS

Aug. 4, 2017 Search Report issued in European Patent Application No. 16202954.0.

(Continued)

*Primary Examiner* — Harry Y Oh
(74) *Attorney, Agent, or Firm* — Oliff PLC

(57) ABSTRACT

A robot control system includes: plural robots; a receiving unit that receives a robot dispatch request from a user; a sensor that detects a state of the user who performs the robot dispatch request; and a controller that determines priority on the robot dispatch request based on the state of the user detected by the sensor, selects, in a case where plural robot dispatch requests are received, a robot to be dispatched among the plural robots in order of the priority on the robot dispatch requests, and dispatches the robot.

9 Claims, 12 Drawing Sheets

(56) References Cited

U.S. PATENT DOCUMENTS

| | | | |
|---|---|---|---|
| 2009/0148034 A1* | 6/2009 | Higaki | G06K 9/3241 |
| | | | 382/153 |
| 2013/0103195 A1* | 4/2013 | Anhalt | B25J 9/163 |
| | | | 700/248 |
| 2016/0151917 A1* | 6/2016 | Faridi | B25J 9/0003 |
| | | | 700/253 |
| 2016/0199977 A1* | 7/2016 | Breazeal | B25J 9/0003 |
| | | | 700/246 |
| 2017/0113353 A1* | 4/2017 | Monceaux | G10L 13/027 |
| 2017/0125008 A1* | 5/2017 | Maisonnier | B25J 11/003 |
| 2017/0185085 A1* | 6/2017 | Storfer | G05D 1/0212 |

OTHER PUBLICATIONS

Kwang-Hyun Park et al: "Robotic smart house to assist people with movement disabilities", Autonomous Robots, Kluwer Academic Publishers, BO, vol. 22, No. 2, Nov. 30, 2006 (Nov. 30, 2006), pp. 183-198.

* cited by examiner

| ID | NAME | STATUS | PERSON-ALITY | ROBOT USE HISTORY | | | | | | | | | | | | | | | | | |
|---|---|---|---|---|---|---|---|---|---|---|---|---|---|---|---|---|---|---|---|---|---|
| | | | | INTERACTIVE ROBOT | | | | | TRANSPORT ROBOT | | | | | ......... | | PROJECTOR ROBOT | | | | |
| | | | | 1 | 2 | 3 | 4 | 5 | 1 | 2 | 3 | 4 | 5 | 1 | 5 | 1 | 2 | 3 | 4 | 5 |
| 0001 | TARO YAMADA | GROUP LEADER | NORMAL | O | O | O | X | X | O | O | X | O | X | ......... | O | X | O | X | X | X |
| 0002 | ICHIRO SUZUKI | DEPARTMENT LEADER | LAID-BACK | O | X | O | O | X | X | X | X | O | X | ......... | X | O | O | X | O | X |
| 0003 | SHINJI SATO | OFFICER | IMPATIENT | X | X | O | O | O | O | X | X | O | O | ......... | X | X | X | O | X | O |
| ...... | ...... | ...... | ...... | ......... | ......... | ......... | ......... | ......... | ......... | ......... | ......... | ......... | ......... | ......... | ......... | ......... | ......... | ......... | ......... | ......... |
| 0579 | SEIROKU FUJI | TEAM LEADER | IMPATIENT | O | X | O | X | X | O | O | X | O | X | ......... | O | X | X | O | X | X |
| 0580 | JIRO KOB-AYASHI | GENERAL STAFF | NORMAL | O | O | O | X | O | O | O | X | O | O | ......... | X | O | O | X | O | O |

1 = INTERNAL MEETING   2 = MEETING WITH BUSINESS PARTNERS   3 = STAND TALKING   4 = LABORATORY WORK   5 = DESK WORK
O = USE HISTORY IS "PRESENT"    X = USE HISTORY IS "ABSENT"

| PARAMETER | | IMPORTANCE OF TASK | STATUS OF USER (AVERAGE VALUE) | STATUS OF USER (MAXIMUM VALUE) | PSYCHOLOGICAL STATE OF USER | PERSONALITY OF USER |
|---|---|---|---|---|---|---|
| DETECTING METHOD | | SCHEDULE TABLE | SCHEDULE TABLE, ID RECOGNITION, USER DATABASE | SCHEDULE TABLE, ID RECOGNITION, USER DATABASE | WEARABLE SENSOR, ENVIRONMENTAL SENSOR | REGISTRATION BEFOREHAND, USER DATABASE |
| WEIGHT | | 0.4 | 0.1 | 0.2 | 0.2 | 0.1 |
| SCALE | 5 | OFFICER MEETING, MEETING WITH IMPORTANT TRADING PARTNERS | OFFICER | OFFICER | EXTREME TENSION, IMPATIENCE, ANGER | IMPATIENT, EASILY OFFENDED |
| | 4 | HEADQUARTER MEETING, MEETING WITH TRADING PARTNERS OF NORMAL LEVEL | DEPARTMENT LEADER | DEPARTMENT LEADER | INTERMEDIATE TENSION, IMPATIENCE, ANGER | |
| | 3 | DEPARTMENT MEETING | GROUP LEADER | GROUP LEADER | MILD TENSION, IMPATIENCE, ANGER | NORMAL |
| | 2 | GROUP MEETING | TEAM LEADER | TEAM LEADER | NORMAL | |
| | 1 | TEAM MEETING | GENERAL STAFF | GENERAL STAFF | RELAX | LAID-BACK, EASYGOING |

FIG. 11

| CONTENTS OF TASK / TYPE OF ROBOT | INTERNAL MEETING | MEETING WITH TRADING PARTNERS | STAND TALKING | LABORATORY WORK | DESK WORK |
|---|---|---|---|---|---|
| INTERACTIVE ROBOT | 0.1 | 0.1 | 0.2 | 0.1 | 0.3 |
| TRANSPORT ROBOT | 0.3 | 0.3 | 0.2 | 0.5 | 0.4 |
| DISPLAY ROBOT | 0.2 | 0.2 | 0.5 | 0.3 | 0.2 |
| PROJECTOR ROBOT | 0.4 | 0.4 | 0.1 | 0.1 | 0.1 |

427

ROBOT CONTROL SYSTEM AND RECORDING MEDIUM

CROSS-REFERENCE TO RELATED APPLICATIONS

This application is based on and claims priority under USC 119 from Japanese Patent Application No. 2016-117763, filed on Jun. 14, 2016.

BACKGROUND

Technical Field

The present invention relates to a robot control system and a recording medium.

SUMMARY

According to an aspect of the invention, there is provided a robot control system comprising: plural robots; a receiving unit that receives a robot dispatch request from a user; a sensor that detects a state of the user who performs the robot dispatch request; and a controller that determines priority on the robot dispatch request based on the state of the user detected by the sensor, selects, in a case where plural robot dispatch requests are received, a robot to be dispatched among the plural robots in order of the priority on the robot dispatch requests, and dispatches the robot.

BRIEF DESCRIPTION OF THE DRAWINGS

Exemplary embodiment(s) of the present invention will be described in detail based on the following figures, wherein:

FIG. 8 is a diagram illustrating an example of a user database 424;

FIG. 10 is a diagram illustrating an example of an urgency degree conversion table 426;

FIG. 11 is a diagram illustrating an example of a robot use probability conversion table 427.

DETAILED DESCRIPTION

Figure 1:
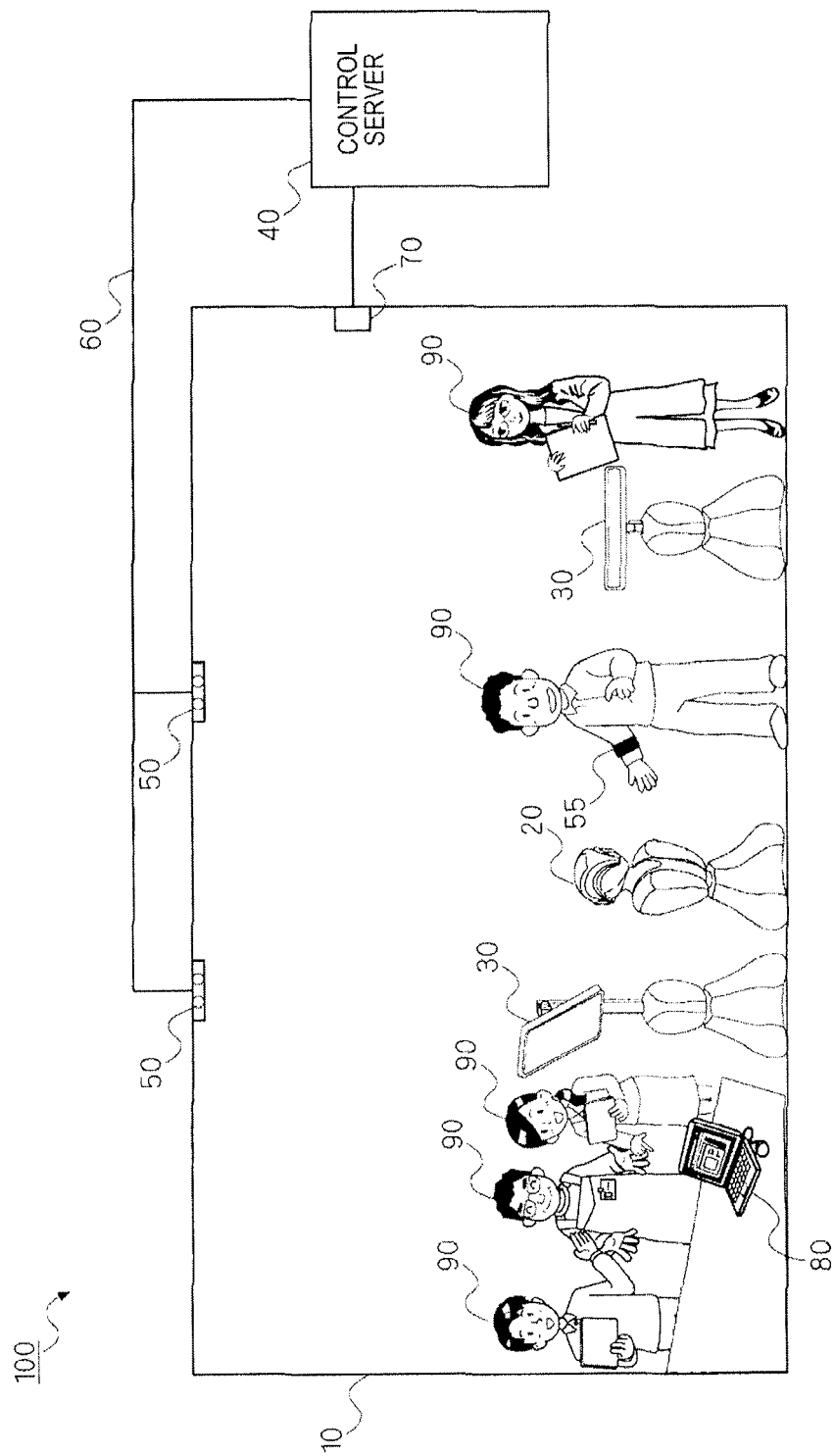
FIG. 1 is an entire schematic view illustrating an example of a robot control system 100 according to an exemplary embodiment of the invention.

A robot control system of an exemplary embodiment of the invention will be described with reference to FIG. 1. A robot control system 100 of the exemplary embodiment is configured to include plural interactive robots 20 that are disposed in a relatively large predetermined area (hereinafter, referred to as a workplace 10) such as one floor (one story) of an office building, plural service executing robots 30, a control server 40, and environmental sensors 50 that are disposed on a ceiling, a wall, or the like of the workplace 10. The control server 40 is connected to each interactive robot 20, each service executing robot 30, and the environmental sensors 50 by a network 60. The environmental sensor 50 is configured to include a RGB camera, a depth sensor, plural microphones, and the like (not illustrated). In addition, the control server 40, each interactive robot 20, and each service executing robot 30 are connected by radio network via an access point 70 disposed on the wall surface or the like of the workplace 10.

In addition, plural computers 80 are disposed in the workplace 10 and are connected to the control server 40 via the access point 70. Scheduling application software is installed in the computer 80.

Plural users 90 exist in the workplace 10 and in the exemplary embodiment, the users 90 are office workers performing a task in the workplace 10. Each user 90 registers his or her schedule data using the scheduling application software installed in the computer 80 and the registered schedule data is stored in a schedule database of the control server 40 via the access point 70 and the network 60. Furthermore, each user 90 wears a wearable sensor 55 on the wrist or the like, and each wearable sensor 55 is connected to the control server 40 via the access point 70. Moreover, the environmental sensors 50 and the wearable sensor 55 detect a robot dispatch request performed by the user 90 and a state of the user 90 performing the robot dispatch request.

Figure 2:
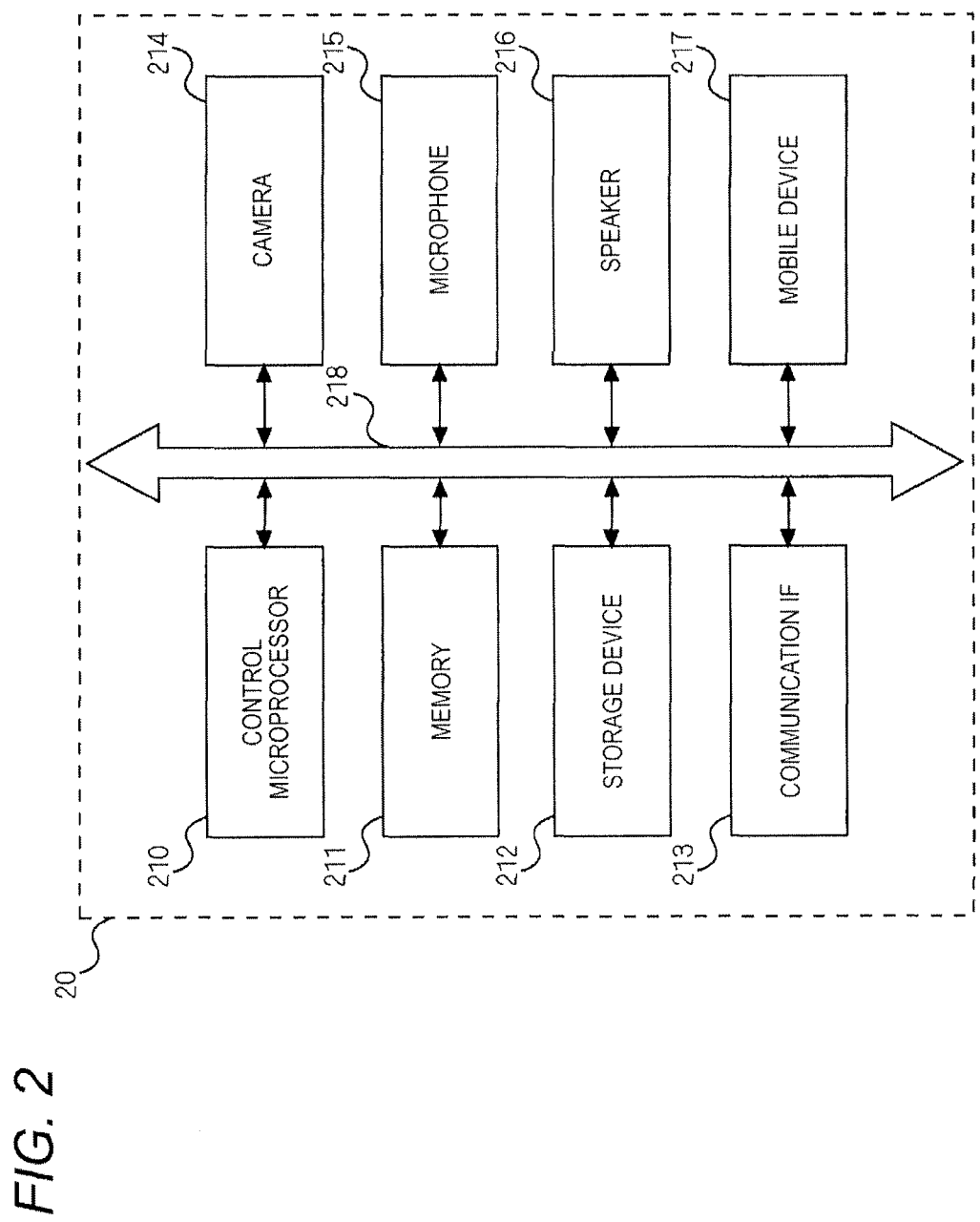
FIG. 2 is a configuration diagram illustrating hardware of an interactive robot 20.

Here, the interactive robot 20 of the exemplary embodiment will be described with reference to FIGS. 2 and 3. FIG. 2 is a configuration diagram illustrating hardware of the interactive robot 20. As illustrated in FIG. 2, the interactive robot 20 is configured to include a control microprocessor 210, a memory 211, a storage device 212 such as a hard disk drive (HDD) or a solid state drive (SSD), a communication interface 213, a camera 214, a microphone 215, a speaker 216, a mobile device 217, and each thereof is connected to a control bus 218.

The control microprocessor 210 controls overall operations of each portion of the interactive robot 20 based on a control program stored in the storage device 212. A voice of dialogue and contents of the dialogue during the dialogue in which the interactive robot 20 is carried out with the user 90, images of a facial expression, a behavior, a state of the body of the user 90, and the like that are photographed by the camera 214 are temporarily stored in the memory 211. A control program for controlling each portion of the interactive robot 20 is stored in the storage device 212. The communication interface 213 performs communication control with which the interactive robot 20 performs communication with the control server 40, other interactive robots 20, or the service executing robot 30 via the access point 70.

The camera 214 photographs the facial expression, the behavior, a change of the state of the body of the user, and the like, and stores those in the memory 211. The microphone 215 detects the voice of the user and stores, that is, records the voice in the memory 211 when performing dialogue with the user. In addition, the contents of the dialogue may be stored in the memory 211 after interpreting the contents of the voice without directly recording the voice. The speaker 216 outputs a voice generated by a conversation controller of the robot 20 that is described below. The mobile device 217 is configured of wheels which are necessary to move the interactive robot 20 to any location, a driving device such as a motor, and a current position detecting device such as a GPS receiver.

Figure 3:
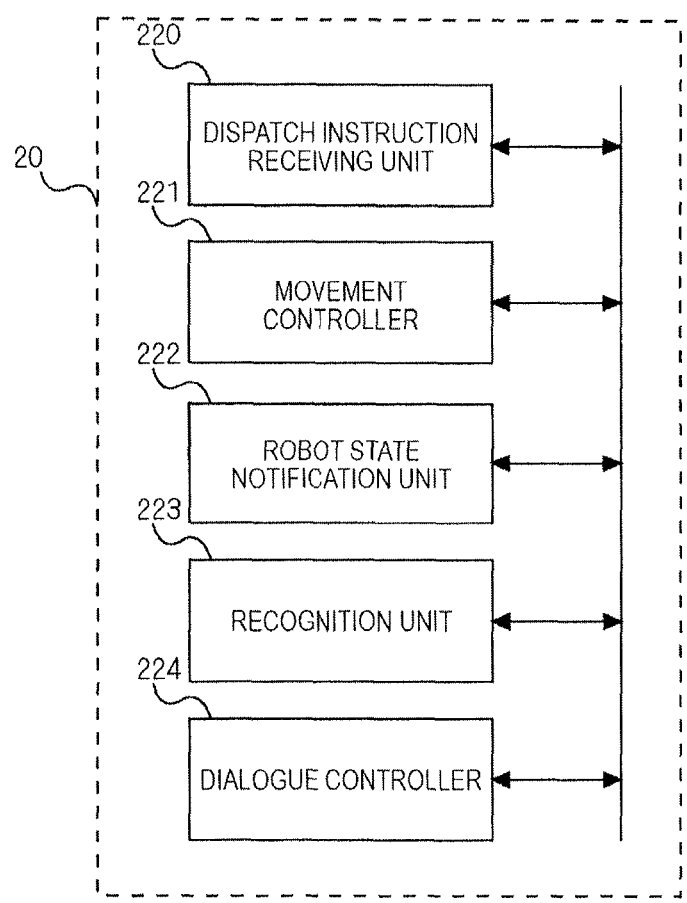
FIG. 3 is a block diagram of a function of the interactive robot 20.

FIG. 3 illustrates a block diagram of a function of the interactive robot 20. As illustrated in FIG. 3, the interactive robot 20 functions as a dispatch instruction receiving unit 220, a movement controller 221, a robot state notification unit 222, a recognition unit 223, and a dialogue controller 224 by executing a control program stored in the storage device 212 in the control microprocessor 210.

The dispatch instruction receiving unit 220 receives a robot dispatch instruction from the control server 40 and temporarily stores the received the robot dispatch instruction in the memory 211. The robot dispatch instruction includes route information from a current position of the interactive robot 20 to a position of the user 90 performing a robot dispatch request. The movement controller 221 moves the interactive robot 20 from the current position to the destination by controlling the mobile device 217 in accordance with the route information included in the robot dispatch instruction that is stored in the memory 211 and current position information detected by a current position detecting device included in the mobile device 217. The robot state notification unit 222 acquires information about the interactive robot 20, for example, information such as the number of ID assigned to the interactive robots 20 in a case where plural interactive robots 20 are used, types of the robots, the current position of the interactive robot 20, a current state of the interactive robot 20 such as whether the interactive robot 20 is in a waiting state, is moved by the robot dispatch instruction, or is during dialogue with the user, and notifies the control server 40 of the information.

The recognition unit 223 recognizes and analyzes a request and feelings of the user 90 through the dialogue between the user 90 and the interactive robot 20. Specifically, the recognition unit 223 specifies the request of the user 90 based on the voice data or contents of the dialogue of the user 90 during the dialogue with the user 90 stored in the memory 211. In addition, the recognition unit 223 analyzes the feelings of the user 90 based on information obtained by being configured of at least one or plural compositions of the behavior, the feelings, colors of the face, the state of the body, a tone of the voice, a speed of the voice, a heart rate of the user during the dialogue with the user 90 stored in the memory 211. For example, the change of the colors of the face can be detected from a change of a RGB rate of an image of the face of the user 90 photographed by the camera 214. The recognition unit 223 detects a change in the heart rate and a body temperature of the user 90 based on the change of the colors of the face of the user 90, and analyzes the feelings of the user based on the detection result.

Furthermore, the recognition unit 223 analyzes the voice data of the user 90 detected by the microphone 215 and stored in the memory 211, and interprets the feelings of the user 90 based on the tone of the voice (tone), the speed of the voice (speed of words), and the like. For the interpretation of the feelings, for example, the interpretation is performed in which "the user is happy" is interpreted from the change in the colors of the face and open state of the mouth, "the user is nervous" is interpreted from a change in the heart rate and conductivity of the skin, and "the user is angry" is interpreted from the tone of the voice and the speed of the words. The recognition unit 223 outputs information about the interpreted request and the feelings to the dialogue controller 224.

The dialogue controller 224 controls dialogue in which the interactive robot 20 is carried out with the user 90 and generates a response content to the user 90. For example, a response message is generated in accordance with a dialogue content stored in the memory 211 and outputs the response message to the speaker 216. In this case, the dialogue controller 224 adjusts a size of an output voice of the message and a speed of the dialogue in accordance with the feelings of the user 90 recognized in the recognition unit 223.

Figure 4:
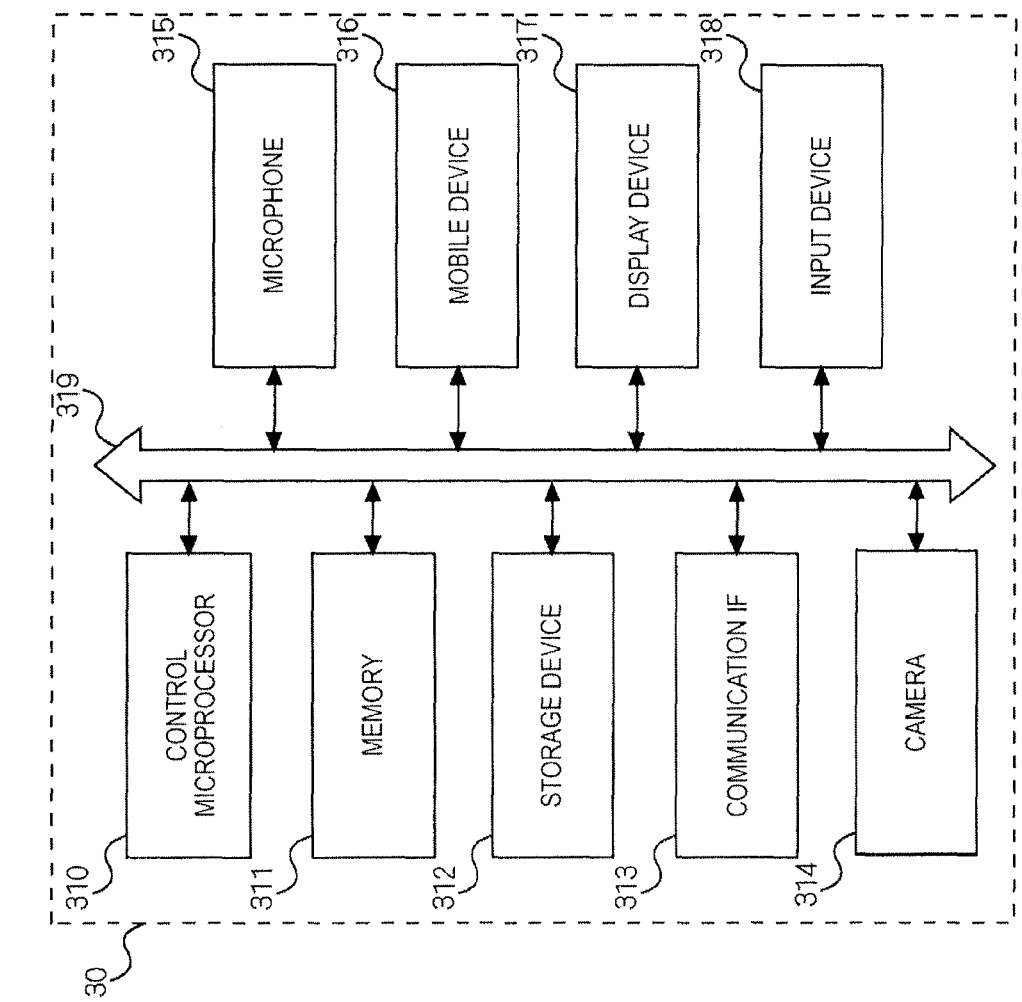
FIG. 4 is a configuration diagram illustrating hardware of a service executing robot 30.

Next, the service executing robot 30 of the exemplary embodiment will be described with reference to FIGS. 4 and 5. The service executing robot 30 is, for example, a transport robot, a display robot, a projector robot, and the like. Moreover, in FIGS. 4 and 5, as the service executing robot, the display robot is described as an example. FIG. 4 is a configuration diagram of hardware of the service executing robot 30 of the exemplary embodiment. The service executing robot 30 is configured to include a control microprocessor 310, a memory 311, a storage device 312, a communication interface 313, a camera 314, a microphone 315, a mobile device 316, a display device 317, and an input device 318, and each thereof is connected to a control bus 319.

The control microprocessor 310 controls overall operations of each portion of the service executing robot 30 by executing the control program stored in the storage device 312. The memory 311 temporarily stores the robot dispatch instruction received from the control server 40 via the communication interface 313. In addition, the memory 311 also temporarily stores an image captured by the camera 314, a voice detected by the microphone 315, and the like. The storage device 312 is a hard disk drive (HDD), a solid state drive (SSD), or the like, and stores a control program for controlling the service executing robot 30. The communication interface 313 performs communication control in which the service executing robot 30 performs communication with the control server 40 via the access point 70 and the network 60.

The camera 314 photographs a surrounding situation when the service executing robot 30 is moved or photographs the face of the user 90 in a case where the user 90 stands in front of the display device 317 of the service executing robot 30 and makes a video phone. The image that is photographed by the camera 314 is temporarily stored in the memory 211. The microphone 315 detects the voice of the user 90 and the like, and temporarily stores the voice and the like in the memory 211. The mobile device 316 is configured of wheels which are necessary to move the service executing robot 30 to any location, a driving device such as a motor, and a current position detecting device such as a GPS receiver.

The display device 317 is configured of a liquid crystal display, an adjusting device for changing an angle or a height of the liquid crystal display, and the like, and displays information stored in the storage device 312 and information acquired from the control server 40, the Internet, and the like via the communication interface 313, the access point 70, and the network 60. The input device 318 is a touch panel disposed on a surface of the liquid crystal display configuring the display device 317. The user 90 comes into contact with a predetermined location of the touch panel while viewing the information displayed in the display device 317 thereby being able to input required information.

Figure 5:
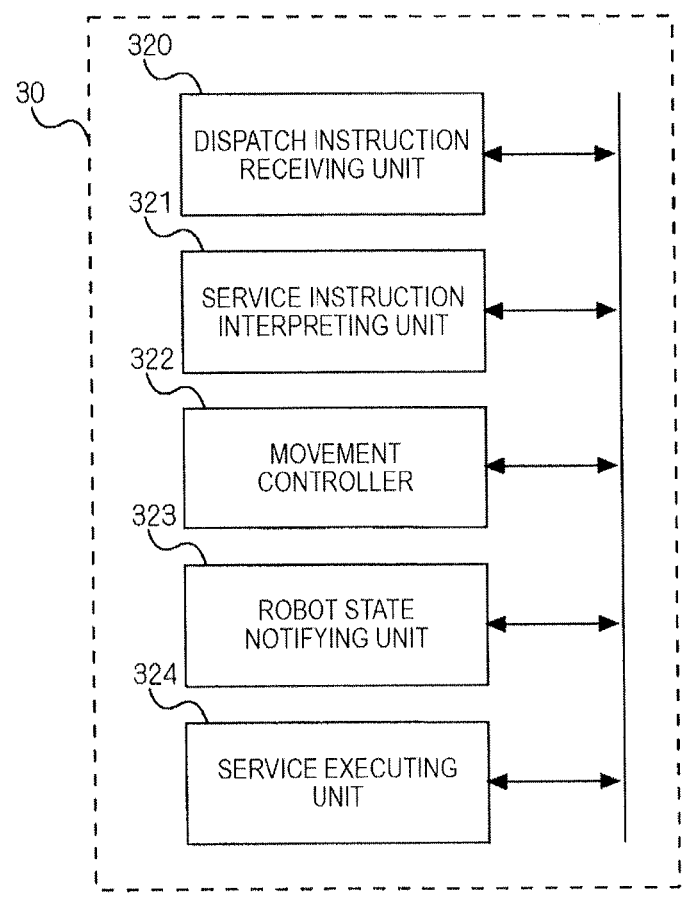
FIG. 5 is a block diagram of a function of the service executing robot 30.

FIG. 5 is a block diagram illustrating a function of the service executing robot 30. As illustrated in FIG. 5, the service executing robot 30 functions as a dispatch instruction receiving unit 320, a service instruction interpreting unit 321, a movement controller 322, a robot state notifying unit 323, and a service executing unit 324 by executing a control program stored in the storage device 312 in the control microprocessor 310.

Dispatch instruction receiving unit 320 receives the robot dispatch instruction from the control server 40. The robot dispatch instruction includes the route information from the current position of the service executing robot 30 to the position of the user 90 performing the robot dispatch request and service instruction information. The service instruction information includes information about what kind of service to be executed is provided (service contents), for whom the service is provided (partner who receives service), and when or how long the service is provided (time when service is provided). Dispatch instruction receiving unit 320 temporarily stores the received robot dispatch instruction in the memory 311.

The service instruction interpreting unit 321 interprets the received service instruction information and generates specific control information for operating each portion of the service executing robot 30. The control information includes information about specific operations such as when and how to operate the display device 317, and which information is displayed (information about what is and how to collect and distribute in a case where the service executing robot 30 is the transport robot), and is temporarily stored in the memory 311.

The movement controller 322 controls the mobile device 316 in accordance with the route information that is included in the robot dispatch instruction stored in the memory 311 and the current position information that is detected by the current position detecting device included in the mobile device 316, and moves the service executing robot 30 from the current position to the position of the user 90 performing the robot dispatch request. The robot state notifying unit 323 notifies information about the robot, for example, the number of IDs respectively assigned to the service executing robots 30 in a case where plural service executing robots 30 are used, types of the robots, the current position of the service executing robots 30, a current state of the service executing robots 30 such as whether the service executing robots 30 is in a waiting state, is moved by the robot dispatch instruction, or is used by the user, and information of a remaining battery level to the control server 40.

The service executing unit 324 operates the display device 317 and the like in accordance with the control information stored in the memory 311 and executes service that is instructed by the service instruction information received from the control server 40.

Figure 6:
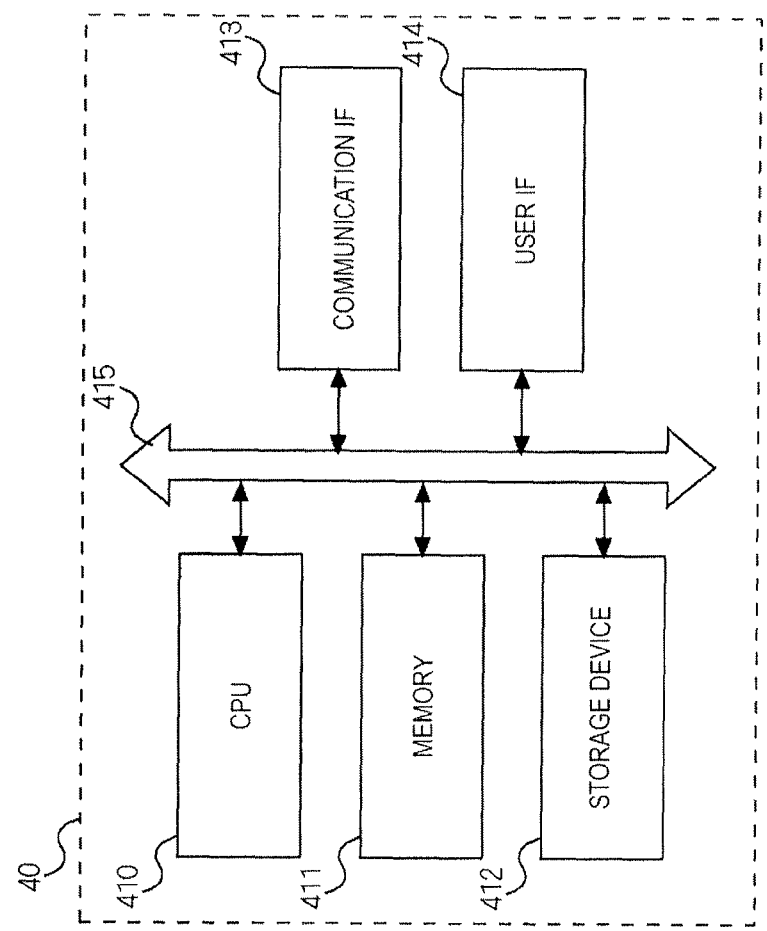
FIG. 6 is a configuration diagram illustrating hardware of a control server 40.

Next, the control server 40 of the exemplary embodiment will be described with reference to FIGS. 6 and 7. FIG. 6 is a configuration diagram illustrating hardware of the control server 40. As illustrated in FIG. 6, the control server 40 is configured to include a CPU 410, a memory 411, a storage device 412, a communication interface 413, and a user interface 414, and each thereof is connected to a control bus 415. The CPU 410 controls overall operations of each portion of the control server 40 based on a control program stored in the storage device 412. The memory 411 temporarily stores information included in the robot dispatch request transmitted from the environmental sensor 50, the robot dispatch instruction transmitted to the interactive robot 20 or the service executing robot 30, and the like.

The storage device 412 is a hard disk drive (HDD), a solid state drive (SSD), or the like, and stores a control program for controlling the control server 40. Furthermore, the storage device 412 stores a user database, a schedule database, a urgency degree conversion table, a robot use probability conversion table, and the like which are described below. The communication interface 413 performs communication control such that the control server 40 performs transmitting and receiving various types of data with each interactive robot 20, the service executing robot 30, the environmental sensors 50, the wearable sensor 55, and the computer 80 via the access point 70. The user interface 414 is configured of a display device such as a liquid crystal display and an input device such as a keyboard and a mouse, and an administrator adjusts the control program stored in the storage device 412 using the user interface 414.

Figure 7:
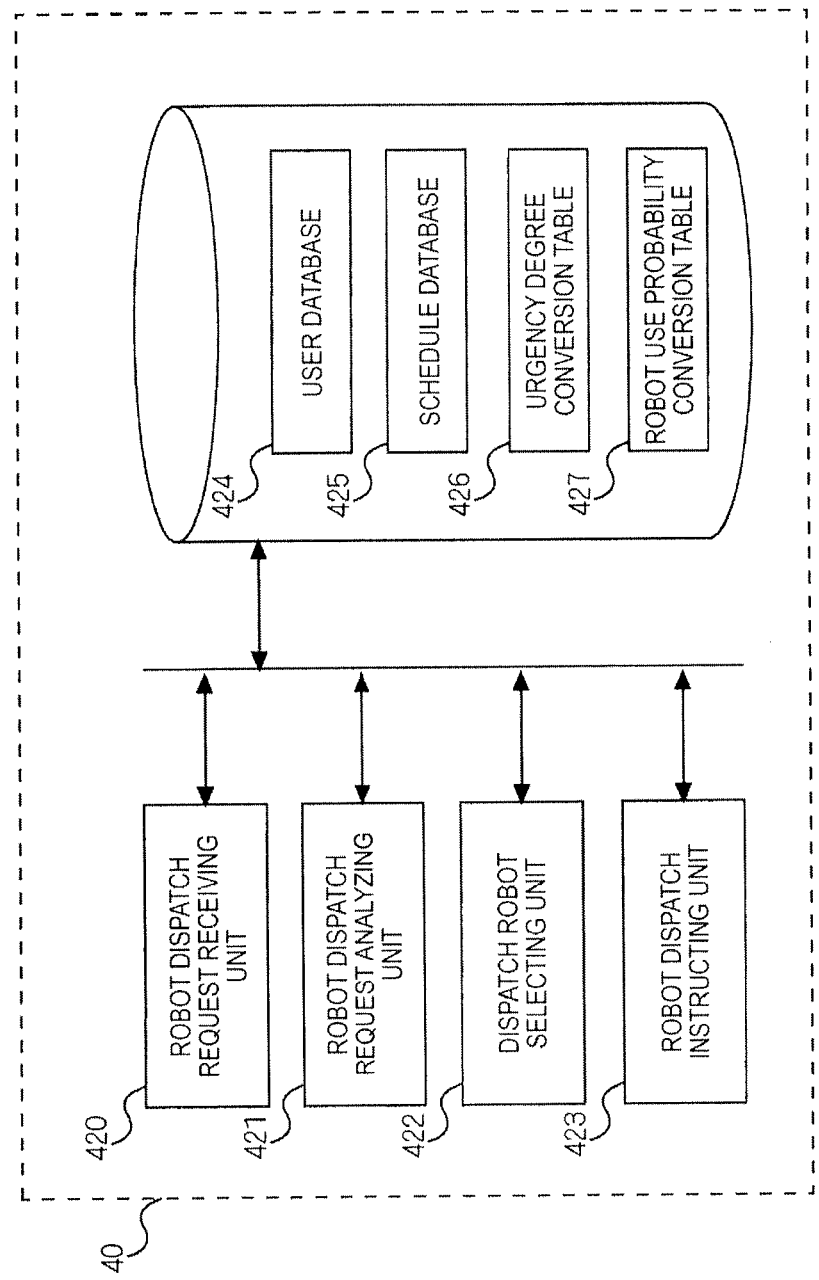
FIG. 7 is a block diagram of a function of the control server 40.

FIG. 7 is a block diagram of a function of the control server 40. As illustrated in FIG. 7, the control server 40 functions as a robot dispatch request receiving unit 420, a robot dispatch request analyzing unit 421, a dispatch robot selecting unit 422, and a robot dispatch instructing unit 423 by executing the control program stored in the storage device 412 in the CPU 410. Furthermore, the control server 40 is configured to include a user database 424, a schedule database 425, a urgency degree conversion table 426, and a robot use probability conversion table 427.

The robot dispatch request receiving unit 420 receives information about the robot dispatch request transmitted from the environmental sensor 50 and the state of the user 90 transmitted together with the robot dispatch request, and stores the information in the memory 411. A behavior as the robot dispatch request may be, for example, an operation such as "beckoning" and "clapping" in addition to a behavior such as "waving hand", and may be a voice with a predetermined content, for example, a calling sound such as "robot" which is detected by the environmental sensor 50. The information about the state of the user 90 includes information for specifying a user that who is the user 90 performing the robot dispatch request which is detected by the environmental sensor 50. Furthermore, the information about the state of the user 90 may include at least one of the current position information of the user which indicates where the user 90 is, information indicating signs of the body representing a psychological state of the user such as what kind of face expression and what kind of behavior of the user 90 is provided, and information about a state of a field where the user 90 exists such as whether the user 90 is involved in any activity, who are around the user 90, and whether those are involved in any activity. Moreover, these are an example of information about the state of the user 90 and the state of the user 90 may utilize any type of information as long as the environmental sensor 50 and the wearable sensor 55 are able to detect the information with respect to the user 90. In any case, it is necessary to include information at least specifying the user 90. The information about the state of the field where the user 90 exists is, for example, information such as "several persons are standing", "sitting around a table", and "having a conversation", and information of specifying a person performing a task with the user 90.

The robot dispatch request receiving unit 420 not only receives a robot dispatch request signal from the environmental sensor 50 but also may receive the wearable sensor 55 which is worn on the body of the user 90. In this case, similar to the environmental sensor 50, if the wearable sensor 55 detects a predetermined operation or a behavior such as "waving hand" of the user 90 as the robot dispatch request, the wearable sensor 55 transmits the information identifying the user 90 and the information about the state of the user 90 including signs representing a psychological state of the user 90 such as the heart rate and a body temperature of the user 90 detected by the wearable sensor 55 to the control server 40 as the robot dispatch request signal.

The robot dispatch request analyzing unit 421 determines high priority of the robot dispatch request in accordance with the state of the user 90 performing the robot dispatch request. Specifically, the robot dispatch request analyzing unit 421 refers the user database 424, the schedule database 425, and the urgency degree conversion table 426 based on the information about the state of the user 90 received by the robot dispatch request receiving unit 420, calculates a status (job title) and personality of the user 90, a current task performed by the user 90, and a psychological state of the user 90, and determines high priority with respect to the robot dispatch request. The robot dispatch request includes the information specifying the user 90 performing the robot dispatch request. Thus, the robot dispatch request analyzing unit 421 refers the user database 424 based on the information thereby specifying the status and an original personality of the user 90. In addition, the robot dispatch request analyzing unit 421 specifies the current task of the user 90 by referring the schedule database 425.

In addition, the robot dispatch request analyzing unit 421 specifies a current psychological state of the user 90, for example, "extreme tension, impatience, anger", "mild tension, impatience, anger", "normal", "relax", and the like based on information about the signs representing the psychological state of the user 90 received from the environmental sensor 50 and/or the wearable sensor 55. The robot dispatch request analyzing unit 421 calculates the degree of urgency of the robot dispatch request by the user 90 by referring the urgency degree conversion table 426 based on at least one of the status, the personality, the current task, and the current psychological state of the user 90. A calculating method of the degree of urgency of the robot dispatch request will be described later.

In a case where the dispatch robot selecting unit 422 receives plural robot dispatch request signals at the same time or substantially at the same time (within a predetermined time period), the dispatch robot selecting unit 422 refers a robot use history of the user 90 registered in the urgency degree conversion table 426 and the user database 424 described below in order from high priority of the robot dispatch request calculated by the robot dispatch request analyzing unit 421 among plural robot dispatch requests, that is, preferentially from the robot dispatch request having high priority based on the task of the user 90 that is specified by the robot dispatch request analyzing unit 421. And then the dispatch robot selecting unit 422 selects the robot of the highest use probability or the robot of high availability. Furthermore, the dispatch robot selecting unit 422 lists up individual robot corresponding to a type of a selected robot as an available robot based on a distance to the user 90, the current state of the robot, and the remaining battery level, and selects the most appropriate robot as a robot to be dispatched.

The robot dispatch instructing unit 423 generates the robot dispatch instruction that is configured of the route information from the current position of the robot to the position of the user 90 performing the robot dispatch request with respect to the interactive robot 20 or the service executing robot 30 that is selected as the robot to be dispatched, and the service instruction information including contents of service to be provided. And then the robot dispatch instructing unit 423 transmits the robot dispatch instruction to the interactive robot 20 or the service executing robot 30 that is selected as the robot to be dispatched via the communication interface 413.

The user database 424 is provided by registering an ID, a name, a status, a personality, and a use history of the interactive robot 20 and the service executing robot 30 by the user which are associated with each other for each user 90 performing a task in the workplace 10. FIG. 8 is a diagram describing an example of the user database 424. The user database 424 stores the name, the status, the personality, presence or absence of use of the interactive robot 20 and the service executing robot 30 in a past predetermined time period which are associated with each other with respect to the ID of each user 90. As the status of the user 90, there are "officer", "department leader", "group leader", "team leader", "general staff", and the like. As classification of the personality of the user 90, there are "impatient, easily offended", "normal", "laid-back, easygoing", and the like. For example, the status is registered as "group leader" and the personality of "Taro Yamada" of the ID number "0001" is "normal" in FIG. 8.

As the use history of the interactive robot 20 and the service executing robot 30, whether each user 90 uses any robot for each task in the past predetermined time period is recorded. For example, in FIG. 8, for Taro Yamada of the ID number "0001", in the use history of the interactive robot 20, the use history is "present" in "internal meeting", "meeting with business partners", and "stand talking", but the use history is "absent" in "laboratory work" and "desk work".

Figure 9:
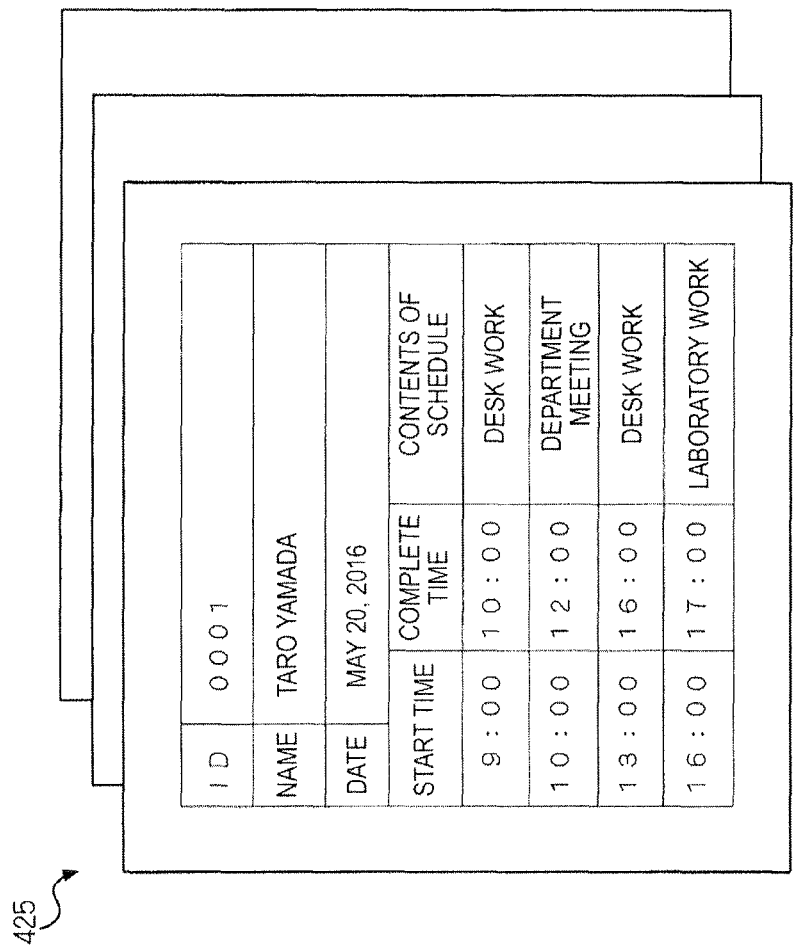
FIG. 9 is a diagram illustrating an example of a schedule database 425.

The schedule database 425 saves the schedule data for each user 90 within the workplace 10. The schedule data is configured of details of the task registered as the schedule, a start time, and a complete time which are associated with the task, and is registered using the computer 80 disposed in the workplace 10 by the user 90 or a portable terminal (not illustrated) carried by the user. FIG. 9 is a diagram illustrating an example of the schedule database 425. As a schedule of "May 20, 2016" of Taro Yamada of the ID number "0001", "desk work" is registered from 9:00 to 10:00, "department meeting" is registered from 10:00 to 12:00, "desk work" is registered from 13:00 to 16:00, and "laboratory work" is registered from 16:00 to 17:00, respectively.

As illustrated in FIG. 10, the urgency degree conversion table 426 illustrates the task, the status, the psychological state, each element of personality, and a value for the urgency degree conversion corresponding thereto of the user 90 which are associated with each other. Specifically, the urgency degree conversion table 426 illustrates the type of the task which is performed by the user 90 and a scale corresponding thereto, an average status of all users existing in the same location as that of the user 90 performing the robot dispatch request and a scale corresponding thereto, a status of a user having the highest job title among users existing in the same location as that of the user 90 performing the robot dispatch request and a scale corresponding thereto, a psychological state of the user 90 performing the robot dispatch request and a scale corresponding thereto, the personality of the user 90 and a scale corresponding thereto, which are associated with each other. A weight is assigned to each element.

For example, in FIG. 10, if a value of "0.4" is assigned in an element of "importance of task" as a weight and the task of the user 90 performing the robot dispatch request is "officer meeting, meeting with important business partners", a value of "5" is assigned as a scale. In addition, if a value of "0.1" is assigned in an element of "average status (average value) of user" as a weight and the average status of the user 90 existing in the field together with the user 90 performing the robot dispatch request is the "department leader", "4" is assigned as a scale. In addition, if a value of "0.2" is assigned in an element of "status (maximum value) of user" and the highest status of the user 90 existing in the field together with the user 90 performing the robot dispatch request is "officer", a value of "5" is assigned as a scale.

Furthermore, if a value of "0.2" is assigned in an element of "psychological state of user" as a weight and the psychological state of the user 90 performing the robot dispatch request is "mild tension, impatience, anger", a value of "3" is assigned as a scale. In addition, if a value of "0.1" is assigned in an element of "personality of user" as a weight and the personality of the user 90 performing the robot dispatch request is "laid-back, easygoing", a value of "1" is assigned as a scale. Moreover, a calculation of the degree of urgency of the robot dispatch request with reference to the urgency degree conversion table 426 will be described later and the degree of urgency is obtained by calculating a total sum by multiplying the "weight" and the "scale" of each element, and the degree of urgency takes values between 1 to 5 as a whole.

As illustrated in FIG. 11, the robot use probability conversion table 427 illustrates values respectively indicating a degree of the use probability of the robot for a type of each robot with respect to the content of the task performed by the user 90 performing the robot dispatch request which are associated with each other. For example, in FIG. 11, in a case where the task of the user 90 performing the robot dispatch request is "internal meeting", a value indicating the use probability of "interactive robot" is set to "0.1", a value indicating the use probability of "transport robot" is set to "0.3", a value indicating the use probability of "display robot" is set to "0.2", a value indicating the use probability of "projector robot" is set to "0.4".

Figure 12:
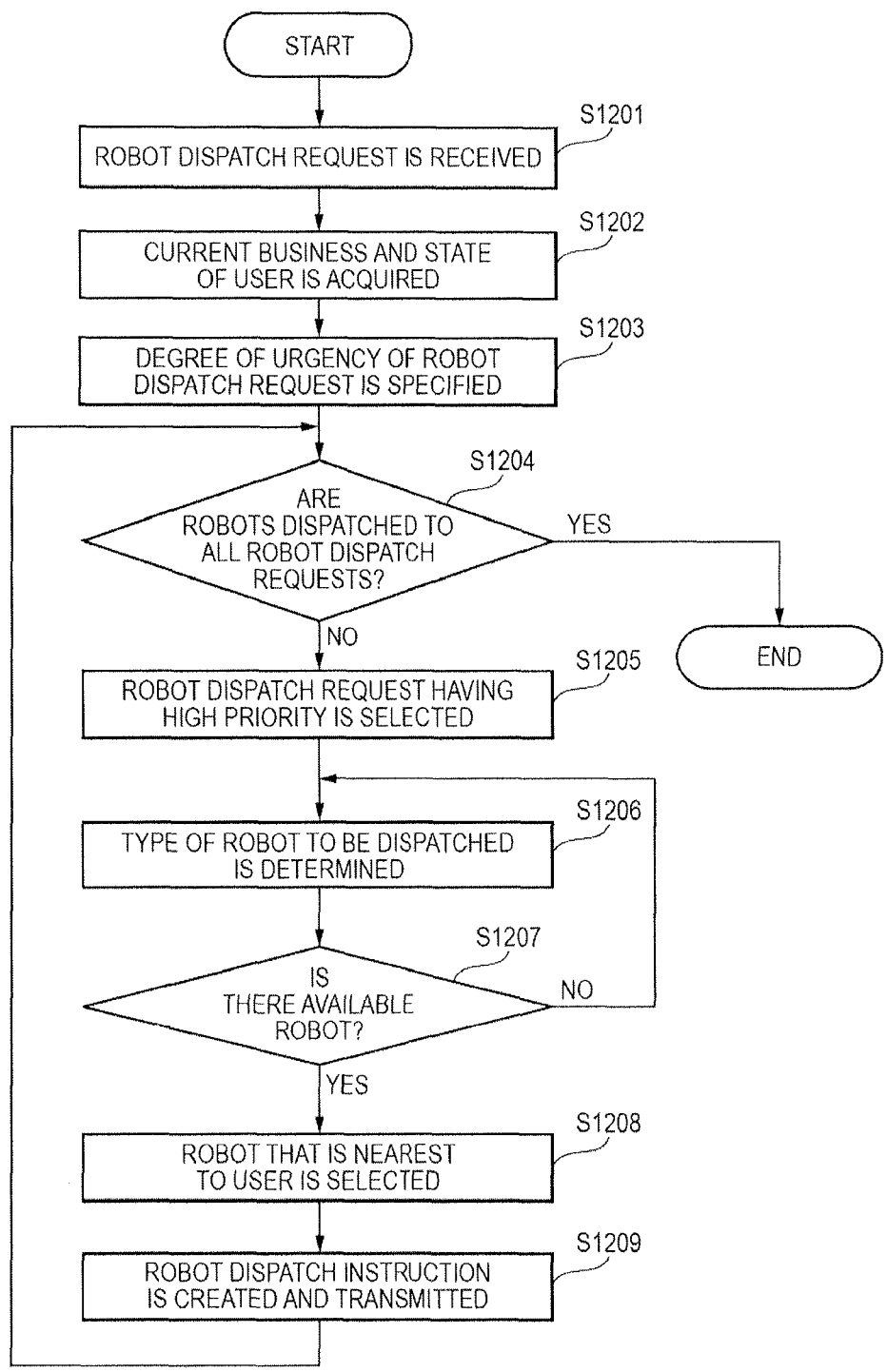
FIG. 12 is a flow chart illustrating a flow of an operation of the control server 40 of a robot control system 100.

Next, an operation in the robot control system 100 of the exemplary embodiment will be described with reference to FIG. 12. Moreover, FIG. 12 is a flow chart illustrating a flow of an operation of the control server 40 of the robot control system 100. First, if the user 90 that is performing a task in the workplace 10 performs a predetermined operation in advance as the robot dispatch request such as "waving hand", "beckoning", and "clapping", or issues calling sound which is determined in advance as the robot dispatch request such as "robot", the environmental sensor 50 or the wearable sensor 55 transmits the robot dispatch request signal to the control server 40 together with the state of the user 90 performing the robot dispatch request. The state of the user 90 includes information about who is the user 90 performing the robot dispatch request and information about the position of the user 90, the face expression of the user 90, the signs of the body representing the psychological state of the user, and the state of the field where the user 90 exists, that is, "several persons are standing", "sitting around a table", and "having a conversation". Furthermore, in a case where other users 90 exist in the field together with the user 90 performing the robot dispatch request, the information indicating the state of the user 90 also includes information specifying who are the other users 90, face expressions and signs of the body representing psychological states of the other users 90.

In step S1201, the robot dispatch request receiving unit 420 of the control server 40 receives the robot dispatch request signal from the environmental sensor 50 or the wearable sensor 55, and temporarily stores the information about the state of the user 90 that is received together with the robot dispatch request in the memory 411.

Next, in step S1202, the robot dispatch request analyzing unit 421 refers the schedule database 425 and specifies the task which is currently performed by the user 90 performing the robot dispatch request and the personality of the user 90. Furthermore, in a case where plural other users 90 exist in addition to the user 90 performing the robot dispatch request, the robot dispatch request analyzing unit 421 refers the user database 424 and acquires and calculates the average status and the maximum status of the users 90 existing in the field based on the status of each user 90. Furthermore, the robot dispatch request analyzing unit 421 specifies the psychological state of the user 90, that is, "extreme tension, impatience, anger", "normal", "relax", and the like based on the information about the face expressions and the signs of the body representing psychological states of the other users 90 performing the robot dispatch request received together with the robot dispatch request.

Next, in step S1203, the robot dispatch request analyzing unit 421 refers the urgency degree conversion table 426 based on information analyzed in step S1202 and calculates the degree of urgency of the robot dispatch request. For example, in a case where the task that is performed by the user 90 performing the robot dispatch request is "headquarter meeting, meeting with business partners of normal level", the average status of the users 90 of the field is "department head", the maximum status of the users 90 of the field is "officer", the psychological state of the user 90 performing the robot dispatch request is "mild tension, impatience, anger", and the personality is "laid-back, easygoing", the degree of urgency is obtained by "importance of task 0.4×4 (headquarter meeting, meeting with business partners of normal level)+the status of user (average value) 0.1×4 (department leader)+the state of the user (maximum value) 0.2×5 (officer)+the psychological state of the user 0.2×3 (mild tension, impatience, anger)+the personality of the user 0.1×1 (laid-back, easygoing)=3.7". Moreover, in a case where the robot dispatch request receiving unit 420 receives plural robot dispatch requests substantially at the same time or within predetermined time period, the robot dispatch request analyzing unit 421 calculates the degree of urgency with respect to the robot dispatch request by executing the process of steps S1201 to S1203 for each robot dispatch request and sets priorities with respect to the robot dispatch requests. Moreover, in the example described above, the degree of urgency is calculated based on all the task, the status, the psychological state, and the personality of the user 90, but the degree of urgency may be calculated based on at least one of the elements described above.

Next, in step S1204, the dispatch robot selecting unit 422 determines whether or not robots are dispatched to all the robot dispatch requests. If the robots are dispatched to all the robot dispatch requests, the process is completed and if the robot is not dispatched with respect to the robot dispatch request, the process proceeds to step S1205. In step S1205, the dispatch robot selecting unit 422 selects one robot dispatch request of which the priority is the highest among the robot dispatch requests to which the robots are not dispatched.

In step S1206, the dispatch robot selecting unit 422 refers the robot use probability conversion table 427 and the user database 424 based on the details of the task of the user 90 performing the robot dispatch request, and selects a type of the robot having the highest use probability in the task. For example, in a case where the user 90 performing the robot dispatch request is "Taro Yamada" of the ID number "0001" in the user database 424 and the current task of the user 90 is "department meeting" with reference to the schedule database 425, this corresponds to "internal meeting" in the robot use probability conversion table 427, in this case, the use probability of the projector robot is "0.4", and the use probability is the highest. However, the dispatch robot selecting unit 422 refers the user database 424 and corrects a value of the use probability of the robot based on the past robot use history of the user 90 performing the robot dispatch request.

For example, the use probability of the robot which has an achievement of being used in a past predetermined time period is corrected to 1.5 times and the use probability of the robot which does not have the achievement of being used is corrected to 0.5 times. For example, in a case where the user 90 performing the robot dispatch request is "Taro Yamada", referring the user database 424 of FIG. 8, it can be seen that the achievement of use (use history) of the projector robot is "absent" in "internal meeting" and the achievement of use of the transport robot is "present". Therefore, the dispatch robot selecting unit 422 corrects the use probability of the transport robot to "0.3×1.5=0.45" and corrects the use probability of the projector robot to "0.4×0.5=0.2". Therefore, the use probability of the transport robot of "Taro Yamada" is the highest in "internal meeting". Therefore, the dispatch robot selecting unit 422 selects the transport robot as the type of the robot to be dispatched with respect to the robot dispatch request.

In step S1207, the dispatch robot selecting unit 422 lists available robots corresponding to the types of the robots to be dispatched. For example, in the above case, the dispatch robot selecting unit 422 lists the transport robots which are available among the transport robots, that is, the robots existing in a standby state within a predetermined range from a position where the robot dispatch request is made, not currently used by other users, and with remaining battery level being a predetermined one or more. Furthermore, the dispatch robot selecting unit 422 determines whether a robot which is available by the user 90 performing the robot dispatch request exists and, in a case where there is not an available robot, the process returns to step S1206, and a type of a robot having the next high use probability is specified. In a case where there is an available robot, the process proceeds to step S1208.

In step S1208, the dispatch robot selecting unit 422 selects the robot to be dispatched which is in a position nearest to the user 90 performing the robot dispatch request or in a position from which a moving distance is shortest to the user 90 among the list of the available robots. In step S1209, the robot dispatch instructing unit 423 generates the robot dispatch instruction, transmits the robot dispatch instruction to the interactive robot 20 or the service executing robot 30 as the robot to be dispatched selected in step S1208 via the communication interface 413, the process returns to step S1204, the process of steps S1205 to S1209 is repeatedly performed until the robots are dispatched for all the robot dispatch requests. Moreover, the robot dispatch instruction is configured to include the route information from the current position of the selected robot to be dispatched to the user 90 performing the robot dispatch request and the service instruction information including the contents of the service to be provided.

Moreover, the route information included in the robot dispatch instruction is generated by referring map information stored in advance in the storage device 412 by the robot dispatch instructing unit 423 and performing path search from the current position of the robot to be dispatched to the position of the user 90 performing the robot dispatch request. Moreover, locations having high risk to collide with persons such as high-traffic locations where many people pass are registered in the map information in advance and the route may be generated so as to avoid the high risk locations when performing the path search.

If the interactive robot 20 or the service executing robot 30 as the robot to be dispatched receives the robot dispatch instruction, the movement controllers 221 and 322 controls the mobile devices 217 and 316 in accordance with the route information included in the robot dispatch instruction and the information of the current position detected by the current position detecting device included in the mobile devices 217 and 316, and move the interactive robot 20 or the service executing robot 30 as the robot to be dispatched from the current position to the position of the user 90 performing the robot dispatch request.

Moreover, in the exemplary embodiment described above, an example, in which the user 90 performing the robot dispatch request requests the dispatch of the robot using the operation such as "waving hand", "beckoning", and "clapping", or the sound such as "robot" as the robot dispatch request, is described. In this case, the user 90 does not explicitly specify the type of the robot. However, the invention is not limited to the exemplary embodiment described above and the user 90 may explicitly perform the robot dispatch request by specifying the type of the robot, for example, using sound. In this case, the process for determining the type of the robot to be dispatched is not necessary in the above step S1206 in FIG. 12. However, in a case where the type of the robot that is specified by the user 90 is not available, the dispatch robot selecting unit 422 of the control server 40 specifies a type of a robot which is considered to be the robot having the next high use probability as the robot to be dispatched.

In addition, in the exemplary embodiment described above, the robot dispatch request analyzing unit 421 refers the schedule database 425 and thereby the task of the user 90 performing the robot dispatch request is specified. However, the invention is not limited to the exemplary embodiment described above and the robot dispatch request analyzing unit 421 may further correct the task of the user 90 that is specified with reference to the schedule database 425 based on the situation of the field acquired by the environmental sensor 50. For example, the most frequent task in the registered task may be determined as the task of the user 90 performing the robot dispatch request with reference to the schedule database 425 of the user 90 performing the robot dispatch request and all the other users 90 existing in the field specified by the environmental sensors 50. Otherwise, the task of a person having the highest status among all the users 90 existing in the field may be determined as the task of the user 90 performing the robot dispatch request.

Furthermore, in the exemplary embodiment described above, when determining the type of the robot to be dispatched, the dispatch robot selecting unit 422 corrects the value of use probability with reference to presence or absence of the robot use history of the user database 424 in the values of the robot use probability conversion table 427 with respect to the specified task. However, the invention is not limited to the exemplary embodiment described above and a correction table may be prepared for each user 90, and the values of the robot use probability conversion table 427 with respect to the specific task may be corrected with reference to the correction table of the user 90. Then, a value of the correction table may be updated whenever a specific robot is used when the user 90 performs a specific task and the use probability of the robot may be higher as a frequency of use of the specific robot increases. In addition, in a case where the specific robot is not used in a predetermined time period, a correction value of the correction table corresponding to the robot may be lowered.

Furthermore, the robot dispatch instructing unit 423 not only generates the route information from the current position of the robot to be dispatched to the user performing the robot dispatch request based on the map information stored in the storage device 412 in advance, but also may generate the route information based on the information acquired from another interactive robot 20 or service executing robot 30 that is not selected as the robot to be dispatched and the information acquired from the environmental sensor 50. For example, a situation in the vicinity of the route generated based on the map information stored in the storage device 412 in advance is acquired from the interactive robot 20, the service executing robot 30, or the environmental sensor 50 and if there is a location where other users 90 who do not perform the robot dispatch request are gathered to have a meeting, or there is a quiet location where other users 90 perform desk work, the route information is modified such that the robot passes through a specific location so as not to disturb the users 90 or passes through a location to avoid a predetermined location so as not to disturb the users 90. Otherwise, the route information is modified by adding an instruction to quietly pass through the location such that the robot passes through the location where other users 90 are gathered to have a meeting, or the quiet location where other users 90 perform desk work at different speed, that is, the passing speed is reduced at the location.

Furthermore, the robot dispatch instructing unit 423 acquires the situation in the vicinity of the route from the environmental sensor 50 or other robots. For example, in a case where it is determined that there is a risk of collision at a location possibly serving as a dead angle, the robot dispatch instructing unit 423 may generate a modified route so as to avoid the location having the risk and transmit it to the robot as new route information. The route information is updated in real time and thereby the robot to be dispatched moves along the route avoiding the location having the risk.

Moreover, in the exemplary embodiment described above, in a case where the robot dispatch request is performed by the user 90, the type of the robot to be dispatched is determined in accordance with at least one of the task content, the status, the personality, and the past situation of use of the robot of the user 90. However, in a case where the robot to be dispatched is the interactive robot 20, the personality of the interactive robot 20 may be changed in accordance with at least one of the task content, the status, the personality, and the past situation of use of the robot of the user 90.

Furthermore, when the interactive robot 20 is dispatched to the position of the user 90 as the robot to be dispatched, in a case where other users 90 exist in the position together with the user 90, the robot dispatch instructing unit 423 of the control server 40 may refer the user database 424 and determine which of the users 90 existing there dialogue with is to be performed. The robot dispatch instructing unit 423 of the control server 40 may include such dialogue information in the robot dispatch instruction. In this case, the robot dispatch instructing unit 423 specifies the user 90 to be a dialogue partner based on a relationship among the users 90 existing there, for example, a boss or a subordinate, hierarchical relationship, a good relationship, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A robot control system comprising:
a central processing unit (CPU) programmed to
receive a robot dispatch request from a sensor;
determine, in response to receiving a plurality of robot dispatch requests, priority of the plurality of robot dispatch requests based on a sign of a body representing a psychological state of a user;
select a robot among a plurality of robots in order of the priority based on a task of the user; and
dispatch the robot selected among the plurality of robots.

2. The robot control system according to claim 1,
wherein the CPU determines the priority by specifying at least one of a status, a task, and the psychological state of the user based on the state of the user who performs the robot dispatch request.

3. The robot control system according to claim 2,
wherein, in selecting the robot, the CPU specifies the task of the user with reference to a schedule table of the user.

4. The robot control system according to claim 2,
wherein the CPU selects a robot having a highest probability among use probabilities of all of the plurality of robots as the robot to be dispatched.

5. The robot control system according to claim 2,
wherein the CPU selects a robot having a highest probability among use probabilities of all of the plurality of robots with reference to a table storing values of the use probabilities of the plurality of robots and the task correlated with each other, the values of the use probabilities being corrected based on a robot use history of the user.

6. The robot control system according to claim 1,
wherein, in dispatching the robot, the CPU directs a route of the robot in accordance with information acquired by the sensor such that the robot passes through or avoids a predetermined point.

7. The robot control system according to claim 1,
wherein, in the dispatching the robot, the CPU instructs the robot to pass through a predetermined point with different speed in accordance with information acquired by the sensor.

8. A non-transitory computer readable recording medium storing a program causing a computer to execute a process comprising:
determining priority on a plurality of robot dispatch requests by a user based on a state of the user performing the robot dispatch request received from a sensor, and
dispatching a robot by selecting the robot having highest probability among a use probability of all of a plurality of robots to be dispatched among the plurality of robots that are waiting for a dispatch order.

9. The robot control system according to claim 1,
wherein the plurality of robots includes a plurality of types of robots,
the CPU determines the priority on a type of the plurality of robots based on the state of the field that is related to an order of shortest movement distance of the robot and determines the type of the robots to be dispatched.

* * * * *